Oct. 14, 1941.           F. L. CARSWELL ET AL           2,259,335
                             SUBDRAIN PIPE
                          Filed July 31, 1939
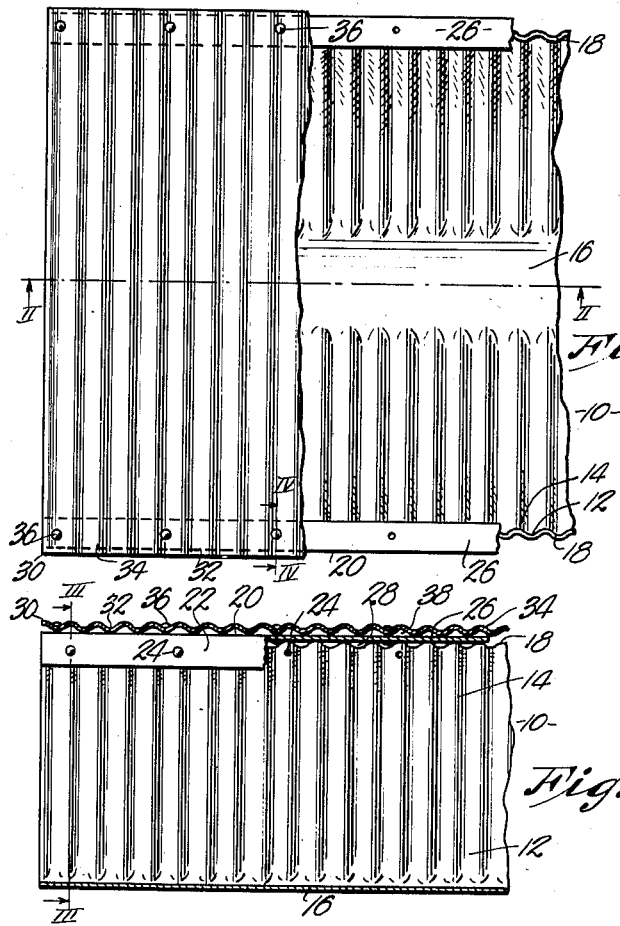
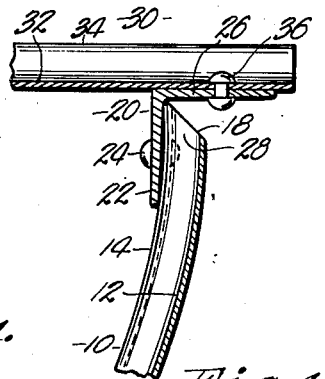
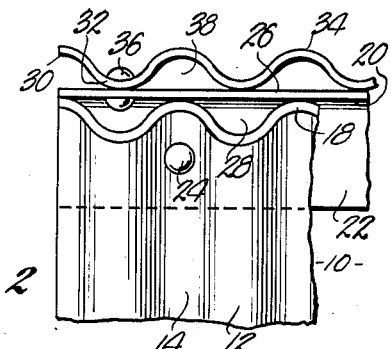
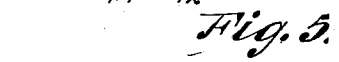
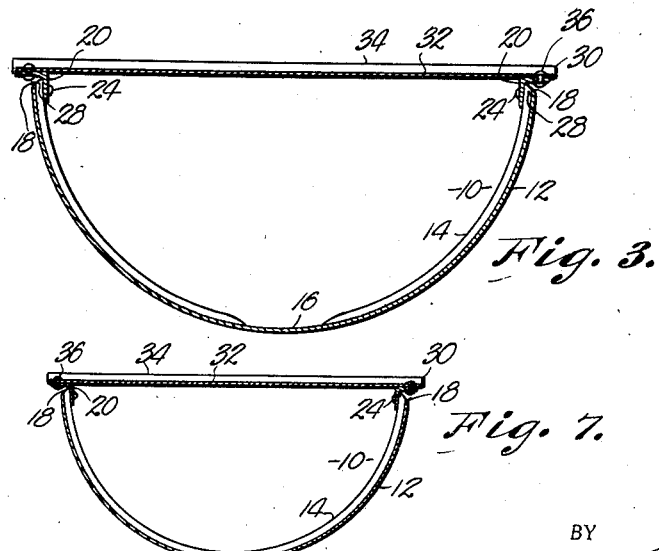
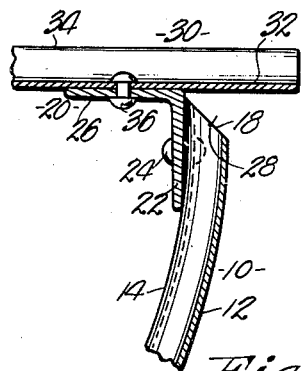
INVENTORS.
Firman L. Carswell,
Otto W. Schmidt.
BY Hovey & Hamilton
ATTORNEYS.

Patented Oct. 14, 1941

2,259,335

UNITED STATES PATENT OFFICE 2,259,335

SUBDRAIN PIPE

Firman L. Carswell, Johnson County, Kans., and Otto W. Schmidt, Kansas City, Mo.

Application July 31, 1939, Serial No. 287,504

5 Claims. (Cl. 61—11)

This invention relates to improvements in subdrain pipe and particularly to sub-drain pipe of the larger sizes for use in rapidly draining large quantities of water from the sub-soil.

The principal object of this invention is the provision of a sub-drain pipe having two vertically spaced apart series of inlet openings adjacent the juncture of the cover plate, with the channel, whereby the inflow of water to the pipe will not be restricted to decrease its efficiency under heavy duty.

Another object of the present invention is the provision of a sub-drain pipe having a transversely corrugated channel member and a transversely corrugated cover plate, joined together by a pair of parallel angle members, whereby a double series of vertically spaced apart openings are formed to admit water to the channel.

Other objects are simplicity and economy of construction, and efficiency of operation.

Reference will now be had to the drawing wherein:

Figure 1 is a plan view of a sub-drain pipe, partly broken away, embodying this invention.

Fig. 2 is a vertical longitudinal section, taken on line II—II of Fig. 1, of the sub-drain pipe with parts broken away for clearness.

Fig. 3 is a vertical cross section taken on line III—III of Fig. 2.

Fig. 4 is an enlarged fragmentary section taken on line IV—IV of Fig. 1.

Fig. 5 is a side elevation of parts shown in Fig. 4.

Fig. 6 is a sectional view showing the angle member positioned with its upper leg extending inwardly; and, Fig. 7 is a cross sectional view of a modified form wherein the channel is corrugated throughout its circumference.

Throughout the several views, like reference characters designate similar parts, and the numeral 10 is a channel member, preferably of semi-circular form and corrugated circumferentially. The corrugations comprise valleys 12 and ridges 14. In order to produce a smooth bottom 16 for the channel, the corrugations are terminated short of the central portion of channel member 10, as clearly shown in Figs. 1 and 3.

Each of the upper edges 18 of channel member 10, is cut on a plane disposed at an angle to the plane of the upper edges of the channel.

An angle member 20 is positioned along each of the spaced apart top edges of the channel, with a downwardly extending leg 22 secured to the inner wall of the channel by rivets 24, and the other leg 26 thereof extending outwardly, above said channel.

The plane of the cut of channel edge 18 is outwardly and downwardly, thereby presenting a series of openings 28 which communicate with the channel, and through which water may pass when the pipe is positioned in the sub-soil. By varying the angle of cut of edge 18, the effective size of the opening may be changed to suit the particular requirements.

A transversely corrugated cover plate 30, having ridges 34 and valleys 32, is secured to angle members 20 by rivets 36, and extends therebeyond to protect the series of openings 38 formed between the cover plate and the angle member. Referring to Fig. 5, it will be noted that the corrugations of cover plate 30 and channel member 10, are so related that the respective series 38 and 28 of openings formed thereby, are disposed in offset relation so that the openings thereof are not in vertical alignment.

When the pipe is positioned in the sub-soil, the excess water will flow into the channel through the upper openings 38 and also through the lower openings at both sides of the pipe. These double openings will insure the filling of the channel to capacity when the sub-soil becomes saturated. The overhanging parts of the pipe serve to protect the openings against clogging, and leg 22 of the angle member, acts as an apron to direct the water passing through openings 38 to a point below openings 28.

This particular arrangement of the channel, angle member, and cover plate, presents a very sturdy structure that will withstand heavy loads passing on the ground surface above the sub-drain pipe.

When the upper leg 26 of angle member 20 is turned inwardly as shown in Fig. 6, the water passing through the upper series of openings, will be directed inwardly to inner edge of leg 26 from which it will fall into the channel. The lower series of openings 28 will be substantially the same as shown in the preferred form.

In Fig. 7 the structure is the same as that shown in Fig. 3, with the exception that the corrugations are continuous throughout the width of the channel, thus adding strength to the structure, however, in this form some water may collect in the valleys to cause rusting of the channel.

The parts have been shown as secured together by means of rivets, however, any other suitable means, such as bolting, welding, etc., may be substituted therefor.

While the preferred form of relative positioning of the parts to form the lower series of inlet openings is shown, yet it is apparent that many other ways of producing a spacing apart of the under surface of the horizontal leg of the angle member to form inlet openings, might be provided by cutting the marginal edge of the channel on a plane at a right angle to the plane shown, or by cutting it on a horizontal plane below the horizontal leg, etc.

It is the primary purpose of this invention to provide a sub-drain pipe having vertically spaced apart series of inlet openings provided with overhanging ledges to prevent clogging of the openings, and some variations might be made in the general structure of the device without departing from the spirit of the invention.

Having thus described the invention, what is claimed as new and desired to be secured by Letters Patent is:

1. A sub-drain pipe comprising a substantially semi-circular channel, circumferentially corrugated and having its longitudinal marginal end surfaces positioned in planes disposed obliquely to a plane determined by the inner edges of the marginal end surfaces; an angle member secured along each of said marginal edges to form a series of inlet openings between the angle member and the inner channel wall with one leg of the angle member extending outwardly thereabove; and a transversely corrugated cover plate secured adjacent its edges to said angle members respectively, to form a series of inlet openings between the cover plate and the leg.

2. A sub-drain pipe comprising an elongated channel of substantially semi-circular cross sectional area and corrugated circumferentially; an angle member secured by one of its legs to each of the inner marginal walls of said channel to form a series of inlet openings therebetween; and a transversely corrugated cover plate carried by said angle members to form a series of inlet openings between the cover plate and the angle member.

3. A sub-drain pipe comprising an elongated channel of substantially semi-circular cross sectional area and corrugated circumferentially; an angle member secured by one of its legs to each of the inner marginal walls of said channel to form a series of vertically disposed inlet passageways therebetween; and a transversely corrugated cover plate carried by said angle members, to form a series of horizontally disposed inlet passageways above and in longitudinal offset relation to the first named series of inlet passageways.

4. A sub-drain pipe comprising an elongated channel of substantially semi-circular cross sectional area having circumferentially disposed corrugations; an angle member fitted over each of the marginal edges of said channel with one leg thereof extending downwardly inside of said channel and with its other leg positioned above and extending outwardly from each margin of said channel, to form a series of vertically disposed inlet passageways beneath said angle member; and a transversely corrugated cover plate secured to said angle members with its marginal edge portions extending respectively therebeyond to form a series of horizontally disposed inlet passageways above said angle member.

5. A sub-drain pipe comprising an elongated channel transversely corrugated with obliquely disposed edge surfaces and a transversely corrugated overlapping cover member carried by said channel with angle members positioned therebetween along the marginal edges of the channel whereby horizontally disposed inlet passageways to the pipe are provided above said angle members and vertically disposed inlet passageways are provided below said angle members.

FIRMAN L. CARSWELL.
OTTO W. SCHMIDT.